Dec. 10, 1957  F. A. HOWARD  2,815,927
HOIST
Filed April 29, 1955  2 Sheets-Sheet 1
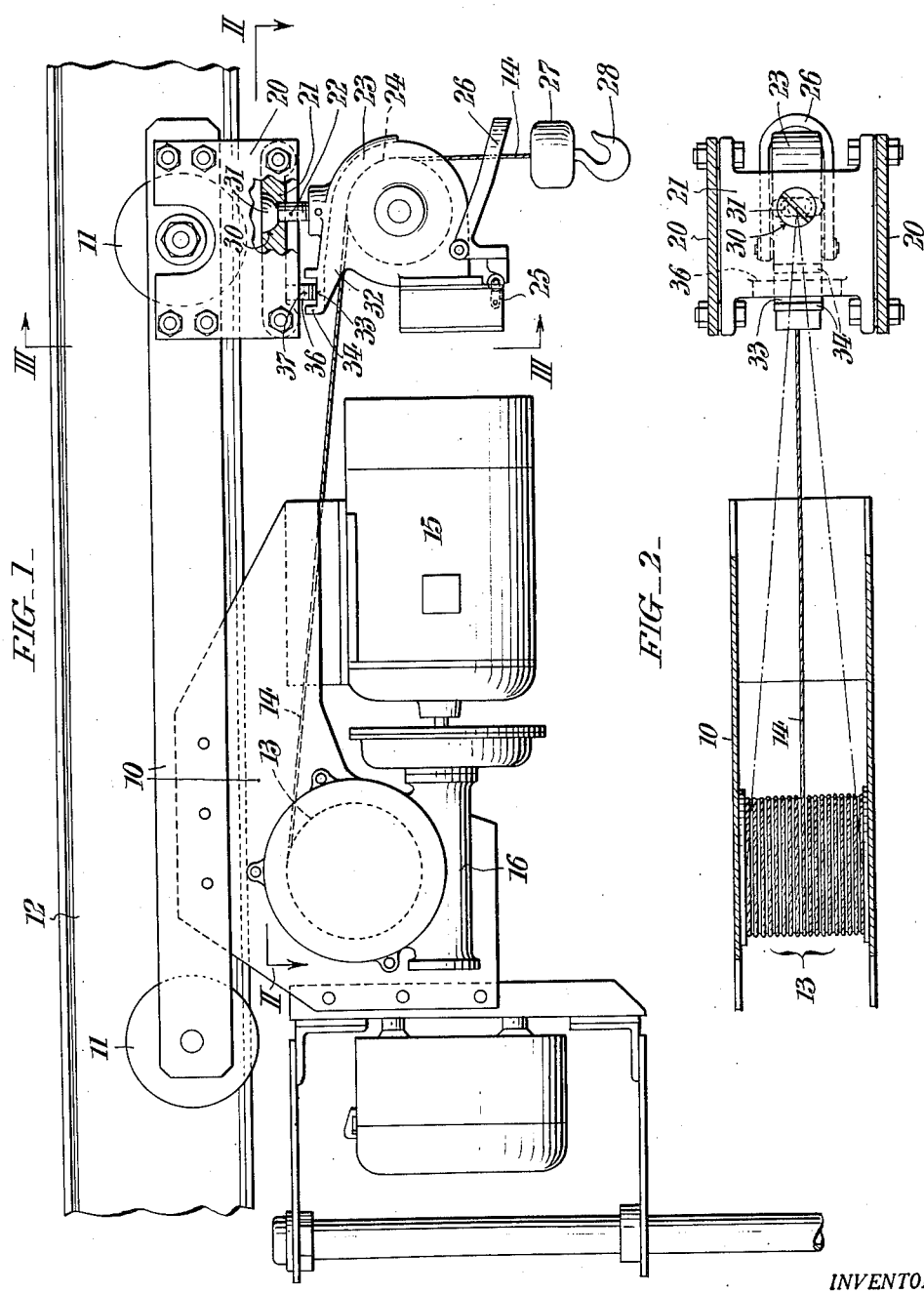
INVENTOR.
Fred A. Howard,
BY Paul & Paul
ATTORNEYS.

Dec. 10, 1957 F. A. HOWARD 2,815,927
HOIST
Filed April 29, 1955 2 Sheets-Sheet 2

INVENTOR.
Fred A. Howard,
BY Paul & Paul
ATTORNEYS.

United States Patent Office 2,815,927
Patented Dec. 10, 1957

2,815,927
HOIST

Fred A. Howard, Reading, Pa.

Application April 29, 1955, Serial No. 504,813

3 Claims. (Cl. 254—168)

This invention relates to a hoist, and more particularly concerns a hoisting apparatus having a drum around which a hoisting cable is wound, and which drum is rotated to raise and lower the load-carrying free end of the cable.

Hoists have previously been proposed which are adapted to be displaced longitudinally along overhead tracks or the like, each such hoist having a pivoted sheave over which a cable extends, the pivot permitting the sheave to swing about a longitudinal axis so that loads may be picked up at one side or the other, as well as directly beneath the sheave. One hoist of that type is shown in the patent to Lock, No. 2,335,568.

In many cases it is desirable to pick up loads which are not only located at one side or the other of the longitudinal axis of the overhead track, but which are also located beyond the end of the track. It is an object of this invention to provide a hoist which efficiently handles loads that are so located.

It is another object of this invention to provide a hoist which is much more versatile and adaptable than hoists now in common use, and which can be economically manufactured and used. Other objects and advantages of this invention will appear in further detail hereinafter and in the drawings, whereof:

Fig. 1 represents an assembly view in vertical elevation showing one form of hoist which embodies features of this invention, certain parts being broken away and others shown in section in order more particularly to illustrate important details;

Fig. 2 represents a sectional view taken as indicated by the lines and arrows II—II which appear in Fig. 1;

Figure 3:
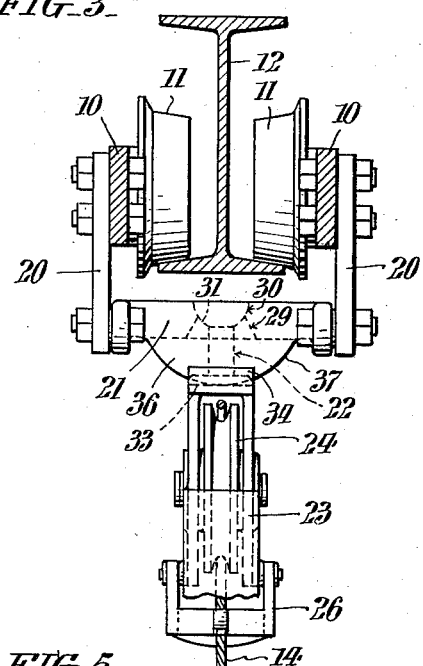
Fig. 3 represents a vertical section taken as indicated by the lines and arrows III—III which appear in Fig. 1.

Turning now to the specific embodiment of the invention selected for illustration in the drawings, the hoist there shown includes a rigid frame 10 mounted on wheels 11 for movement along an overhead track 12. The hoist includes a (grooved) drum 13 around which a cable 14 is wound. A motor 15 is geared to the drum 13 by gearing (not shown) which is located in a housing 16.

Depending from an end of the frame 10 are side members 20 having a transverse floor plate 21 through which a pin 22 extends. Pin 22 carries a sheave housing 23 which carries a rotatably supported sheave 24 over which the cable 14 passes. Sheave housing 23 has an electric, spring-urged limit switch 25 connected to motor 15 and actuated by a yoke 26 when a load block 27 fixed on the end of the cable 14 contacts and lifts said yoke 26. The cable 14 carries a load engaging hook 28 at its end.

Referring more particularly to Figs. 3–7 of the drawings, the floor plate 21 has a curved depression 30 which is a portion of a sphere, and the pin 22 has a head 31 provided with a curved surface portion which is also a portion of a sphere. The spherical head 31 seats in the spherical depression 30, and the pin 22 extends through a slot 29 through the floor plate 21, whereby the pin 22 has capacity for limited tilting movement relative to the support, and has capacity for limited turning movement about the axis of the pin 22 as well.

Figure 7:
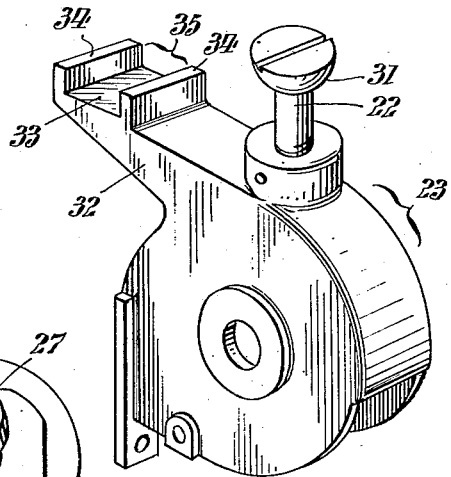
Fig. 7 represents a perspective view of the sheave housing which cooperates with the floor plate of Fig. 6.

Referring more particularly to Fig. 7, the sheave housing 23 has a rearwardly directed extension 32 having at its end a bearing pad 33 provided with a pair of spaced, parallel upright walls 34, 34, forming a channel 35 thereon.

Figure 4:
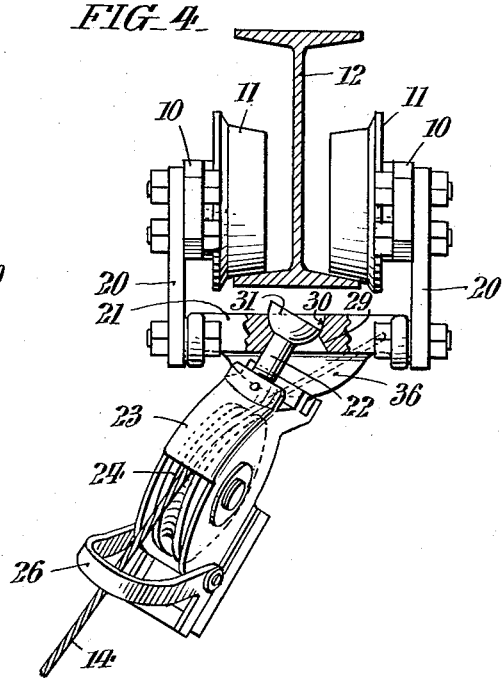
Fig. 4 represents an end view looking from the right toward the left in Fig. 1, showing how the sheave may pivot and rock to an angular position with respect to its support.
Figure 5:
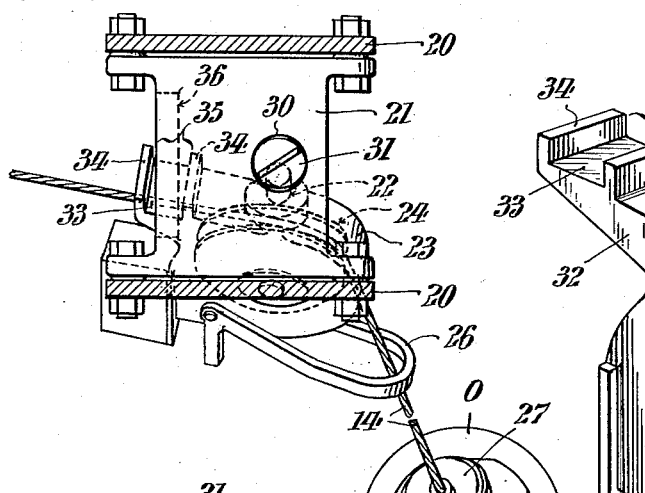
Fig. 5 represents a plan view of the sheave portion of the hoist, with the sheave in the angular position illustrated in Fig. 4.
Figure 6:
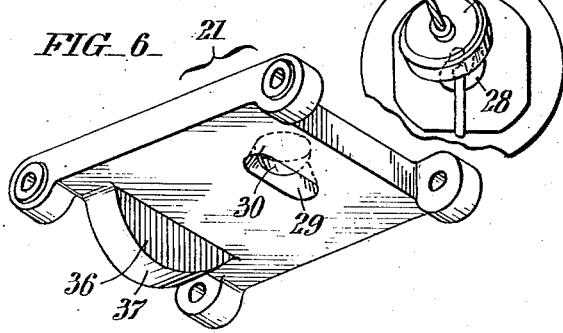
Fig. 6 represents a bottom perspective view of a floor plate on the support for the sheave.

As appears more particularly in Fig. 6, the floor plate 21 has a downwardly extending lug 36 having a curved peripheral surface 37. The lug 36, as indicated in Figs. 3–5, extends down into the channel 35 between the walls 34, 34 and its peripheral edge 37 rides on the surface of the bearing pad 33.

It will accordingly be appreciated that the sheave housing 23 may swing from side to side about a horizontal axis but not rearwardly, since bearing pad 33 contacts lug 36. The edges of the slot 29 may also impede forward swinging movement, or the slot 29 may be much wider than the diameter of pin 22, allowing the sheave housing 23 to swing forwardly. In any event the sheave housing 23 may pivot about the axis of pin 22 whether the housing 23 is vertical or swung to either side, since the spacing between inside surfaces of walls 34, 34 is greater than the thickness of the lug 36. The extent of this pivotal movement is limited by the cooperative action of the lug 36 and one of the walls 34 for, as illustrated in Fig. 5, a wall 34 approaches and ultimately contacts a side of the lug 36, thereby restricting the sheave housing 23 against further pivotal movement about the axis of the pin 22.

In operation, the sheave housing 23 may swing about a horizontal or a vertical axis, or a combination of them. In Figs. 4 and 5, for example, it may be assumed that the load object O is located at one side of the axis of track 12, and beyond its end. To handle the object O, the sheave housing tilts to the side and also swivels about the axis of pin 22, presenting the sheave 24 at a proper angle to accommodate the cable 14 without cutting said cable 14 on the sheave flanges. The motor 13 is actuated by an electric switch, controlled by an operator, to reel in the cable 14. When the object O clears the ground, the sheave housing readily pivots to a vertical position. When load block 27 contacts yoke 26, the motor 15 is automatically de-energized.

While this invention has been shown and described with reference to one specific embodiment thereof, it will be appreciated that various modifications may be made, including the substitution of equivalent elements for those shown in the drawings and the use of certain features independently of the use of other features, all within the spirit and scope of the invention as defined in the appended claims.

Having thus described my invention, I claim:

1. In a hoist, supporting means, a cable winding drum rotatably carried by said supporting means, power means carried by said supporting means and connected to said drum to rotate said drum, a cable adapted to be wound and unwound on and from said drum, load engaging means carried at the end of said cable, a sheave over which said cable passes from said load engaging means to said drum, suspending means for suspending said sheave from said support, said suspending means having a generally spherical surface, said support having a correspondingly generally spherical surface engaging said correspondingly generally spherical surface on said suspending means whereby said sheave has capacity for combined swinging and twisting movement relative to said support, and restrictive means carried by said support for limiting the swinging movement of said sheave toward said drum.

2. The hoist defined in claim 1, wherein said restrictive means includes a downwardly extending lug fixed to said support, and an upwardly facing pad which is fixed to said sheave and engageable with said lug.

3. The hoist defined in claim 2, wherein said bearing pad includes an upwardly extending channel member the flanges of which are spaced from each other at a distance greater than the thickness of said lug.

References Cited in the file of this patent
UNITED STATES PATENTS 2,335,568    Lock _____ Nov. 30, 1943